US011887616B2

(12) United States Patent
Mate et al.

(10) Patent No.: US 11,887,616 B2
(45) Date of Patent: Jan. 30, 2024

(54) AUDIO PROCESSING

(71) Applicant: Nokia Technologies Oy, Espoo (FI)

(72) Inventors: Sujeet Shyamsundar Mate, Tampere (FI); Jussi Artturi Leppänen, Tampere (FI); Miikka Tapani Vilermo, Siuro (FI); Arto Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 56 days.

(21) Appl. No.: 17/418,652

(22) PCT Filed: Jan. 7, 2020

(86) PCT No.: PCT/EP2020/050182
§ 371 (c)(1),
(2) Date: Jun. 25, 2021

(87) PCT Pub. No.: WO2020/148109
PCT Pub. Date: Jul. 23, 2020

(65) Prior Publication Data
US 2022/0068290 A1 Mar. 3, 2022

(30) Foreign Application Priority Data
Jan. 15, 2019 (EP) .................................... 19151807

(51) Int. Cl.
*G10L 21/0208* (2013.01)
*H04N 21/485* (2011.01)
*H04N 21/81* (2011.01)
*G10L 19/012* (2013.01)

(52) U.S. Cl.
CPC ..... *G10L 21/0208* (2013.01); *H04N 21/4852* (2013.01); *H04N 21/8106* (2013.01)

(58) Field of Classification Search
CPC ... G10L 21/0208; G10L 19/00; G10L 19/012; G10L 19/008; G10L 25/51;H04N 21/4852; H04N 21/485; H04N 21/8106; H04N 21/81; H04S 7/30; H04S 7/304;
(Continued)

(56) References Cited

U.S. PATENT DOCUMENTS

| 6,330,486 | B1 | 12/2001 | Padula |
| 7,454,010 | B1 | 11/2008 | Ebenezer |
| 2004/0008850 | A1 | 1/2004 | Gustavsson |
| 2010/0278352 | A1 | 11/2010 | Petit et al. |
| 2012/0288116 | A1* | 11/2012 | Saito ........................ H04R 3/00 381/94.2 |

(Continued)

FOREIGN PATENT DOCUMENTS

| EP | 3131311 A1 | 2/2017 |
| GB | 2548614 A | 9/2017 |
| WO | 2018/100244 A1 | 6/2018 |

OTHER PUBLICATIONS

Extended European Search Report received for corresponding European Patent Application No. 19151807.5, dated Jul. 10, 2019, 12 pages.

(Continued)

*Primary Examiner* — Leshui Zhang
(74) *Attorney, Agent, or Firm* — Harrington & Smith (57) ABSTRACT

An apparatus, method and computer program is disclosed. The apparatus may comprise a means comprising at least one processor and at least one memory including computer program code, the at least one memory and computer program code configured to, with the at least one processor, to receive multimedia data representing a scene, the multimedia data comprising at least audio data representing an audio component of the scene. Another operation may comprise determining a location of unwanted sound in the scene. Another operation may comprise performing first audio processing to remove at least part of the unwanted sound from the determined location. Another operation may comprise performing second audio processing to add artificial sound associated to the unwanted sound at the determined location.

17 Claims, 7 Drawing Sheets

(58) Field of Classification Search
CPC .......... H04S 7/303; H04S 7/302; H04S 3/008;
H04S 3/00; G06F 3/165; G06F 3/011;
G06F 3/167; H04R 3/005
USPC .... 704/200, 200.1, 233, 216, 217, 218, 219,
704/225, 226; 700/94; 381/56, 57, 61,
381/66, 312, 316, 317, 320, 321,
381/71.1–71.14, 73.1, 74, 86, 92, 93,
381/94.1–94.9, 95, 97, 98, 99, 100, 101,
381/102, 103, 111, 112, 113, 114, 115,
381/118, 119, 122
See application file for complete search history.

(56) References Cited

U.S. PATENT DOCUMENTS

| | | | |
|---|---|---|---|
| 2016/0299738 A1* | 10/2016 | Mäkinen | ................... H04S 7/30 |
| 2017/0098453 A1 | 4/2017 | Wright et al. | |
| 2017/0332170 A1 | 11/2017 | Laaksonen et al. | |
| 2017/0353809 A1 | 12/2017 | Zhang et al. | |
| 2018/0310111 A1* | 10/2018 | Kappus | ................... G10K 11/34 |
| 2018/0338213 A1 | 11/2018 | Lehtiniemi et al. | |

OTHER PUBLICATIONS

International Search Report and Written Opinion received for corresponding Patent Cooperation Treaty Application No. PCT/EP2020/050182, dated Mar. 19, 2020, 16 pages.

Office Action received for corresponding Indian Patent Application No. 202147034177, dated Mar. 24, 2022, 6 pages.

* cited by examiner

AUDIO PROCESSING

RELATED APPLICATION

This application claims priority to PCT Application No. PCT/EP2020/050182, filed on Jan. 7, 2020, which claims priority to European Application No. 19151807.5, filed on Jan. 15, 2019, each of which is incorporated herein by reference in its entirety.

FIELD

Example embodiments relate to audio processing, including removal of at least some of an unwanted sound from an audio component of a multimedia scene.

BACKGROUND

Audio capture of real-world scenes is sensitive to natural and sometimes unwanted sounds, for example wind sounds. Wind sound removal is possible using known audio processing techniques, but their application can actually reduce the perceptual quality of the audio. Perceptual quality can be important in certain scenarios, for example where the capture is part of multimedia (or multimodal) content which may comprise both audio and video.

SUMMARY

According to one aspect, there is provided an apparatus comprising means for: receiving multimedia data representing a scene, the multimedia data comprising at least audio data representing an audio component of the scene; determining a location of unwanted sound in the scene; performing first audio processing to remove at least part of the unwanted sound from the determined location; and performing second audio processing to add artificial sound associated to the unwanted sound at the determined location.

The unwanted sound may comprise wind noise, wherein the first audio processing comprises wind noise removal, and the second audio processing comprises adding artificial wind noise.

The determined location may comprise one or more temporal locations in the scene where the unwanted sound is present and wherein the artificial sound is added at or around said one or more temporal locations.

The apparatus may further comprise determining the intensity of the unwanted sound in the time domain and wherein the artificial sound is added with an intensity that is substantially synchronised in the time domain with that of the unwanted sound.

The determined location may comprise one or more spatial locations in the scene where the unwanted sound is present and wherein the artificial sound is only added at or around said one or more spatial locations.

The multimedia data may further comprise video data representing a video component of the scene, wherein the means is configured to determine from the video data one or more of the temporal and spatial locations in the scene where the unwanted sound is present.

The means may be configured automatically to determine the presence of unwanted sound based on movement of objects within the scene at said one or more of the temporal and spatial locations.

The means may be further configured to identify one or more regions of interest within the multimedia data and wherein the amount of sound removal and sound addition depends on whether the determined location of unwanted sound corresponds with the one or more regions of interest.

The means may be configured to remove a different amount of sound from locations corresponding with the one or more regions of interest than those outside the one or more regions of interest.

The means may be configured to remove a greater amount of sound from locations corresponding with the one or more regions of interest than those outside the one or more regions of interest, and to add a greater amount of artificial sound into locations outside the one or more regions of interest than those inside the one or more regions of interest.

The means may be further configured to provide a user interface showing default amounts of sound removal and added sound, and to receive user input for modifying one or both default amounts and enabling playback to preview the effect of said modification.

The multimedia data may further comprise haptic data representing a haptic component of the scene, wherein the means is further configured to determine from the haptic data one or more of the temporal and spatial locations in the scene where the unwanted sound is present.

According to another aspect, there may be provided an apparatus of any preceding definition wherein the means comprises: at least one processor; and at least one memory including computer program code, the at least one memory and computer program code configured to, with the at least one processor, cause the performance of the apparatus.

According to another aspect, there is provided a method comprising: receiving multimedia data representing a scene, the multimedia data comprising a plurality of media components including audio data representing an audio component of the scene; determining a location of unwanted sound in the scene; performing first audio processing to remove at least part of the unwanted sound from the determined location; and performing second audio processing to add artificial sound associated to the unwanted sound at the determined location.

According to another aspect, there is provided a non-transitory computer readable medium comprising program instructions stored thereon for performing a method, comprising: receiving multimedia data representing a scene, the multimedia data comprising a plurality of media components including audio data representing an audio component of the scene; determining a location of unwanted sound in the scene; performing first audio processing to remove at least part of the unwanted sound from the determined location; and performing second audio processing to add artificial sound associated to the unwanted sound at the determined location.

DRAWINGS

Example embodiments will now be described, by way of non-limiting example, with reference to the accompanying drawings, in which.

DETAILED DESCRIPTION

Example embodiments relate to audio processing and particularly to the removal of unwanted sounds. In example embodiments, captured wind sound is given as an example of unwanted sound but other forms of sounds may be considered unwanted. Unwanted sounds may be defined as any form of sound that can be characterised as deriving from a particular source or type of source and for which audio signal processing techniques exist to mitigate or remove said sounds. Other examples may comprise traffic noise and other environmental sources.

Avoidance of audio capture of such unwanted sounds is not always possible or easy to achieve, particularly with less sophisticated capture devices such as mobile telephones or other consumer equipment. However, as mentioned, the presence of unwanted sounds can degrade the perceptual quality. Furthermore, unwanted sound removal techniques can produce unwanted audio artefacts, particularly if the amount of removal is relatively high.

Furthermore still, in the case of a multimedia data representation, sometimes referred to as a multimodal representation, sound removal can produce inconsistencies between the delivered media. For example, consider data representing captured multimedia content comprising an audio component and a video component. In this sense, the term component is used to distinguish what the data represents. The audio component may represent a temporal representation of a scene, and possibly a spatial representation, e.g. through time-frequency (TF) regions or tiles, and the video component may represent a set of visual data of said scene, again possible in the form of regions or tiles. Removal of unwanted sounds such as wind may produce an inconsistency if the video clearly shows a windy scene with trees or hair blowing in a given direction; the inconsistency may be perceived by users, which may detract from the overall integrity of scene reproduction.

Example embodiments therefore may also relate to adding artificial sound associated with the unwanted sound. That is, the artificial sound may be sound of the same or similar type to the unwanted sound, but is not itself the same as the removed sound. For example, in the case of wind, the artificial sound may be additive wind noise, a pre-recorded wind sound or a combination thereof. The artificial sound may be pre-processed in some way as to have advantageous masking properties. Adding a corresponding artificial version of the unwanted sound can disguise or mask artefacts caused by unwanted sound removal techniques.

Example embodiments focus on multimedia data comprising an audio component and a video component. The audio component may comprise any suitable digital representation of captured sound. The audio may for example be monaural, stereo or spatial sound. Spatial sound is sound with a directional component. Similarly, the video component may comprise any suitable digital representation of correspondingly captured video.

Capture of audio may be by means of one or more microphones which may be present in the captured scene. The one or more microphones may comprise a microphone array for capturing sounds from multiple directions and the resulting signals may be post-processed to generate spatial audio data. The one or more microphones may alternatively, or additionally, comprise close-up microphones, typically carried by an audio source such as a person or musical instrument. The one or more microphones may be associated or form part of a video capture device. In this regard, capture of video may be by means of one or more video cameras which may also be present in the captured scene. The captured video may in some way be synchronised to the captured audio. The one or more cameras may, for example, comprise a spatial capture device comprising multiple cameras oriented at respective angles to capture a spatial view of the scene, whereby post-processing effectively stitches the various video tiles or patches together to provide a two-dimensional, three-dimensional or volumetric scene. An example spatial capture device is Nokia's OZO camera system which comprises an array of such cameras and microphones. Example embodiments are therefore applicable to any form of immersive media methods or systems. Such methods and systems are applicable to related technologies, including, but not limited to, Virtual Reality (VR), Augmented Reality (AR) and mixed reality (MR). In a relatively simple form, however, the audio and video capture device may comprise a handheld smartphone or tablet computer having a microphone and video camera for capturing an audio and video component of multimedia content.

In some example embodiments, detection of one or more regions of interest (ROI) may be useful for the purposes of determining where and how to remove unwanted sound and/or to add the artificial version of said sound.

Figure 1:
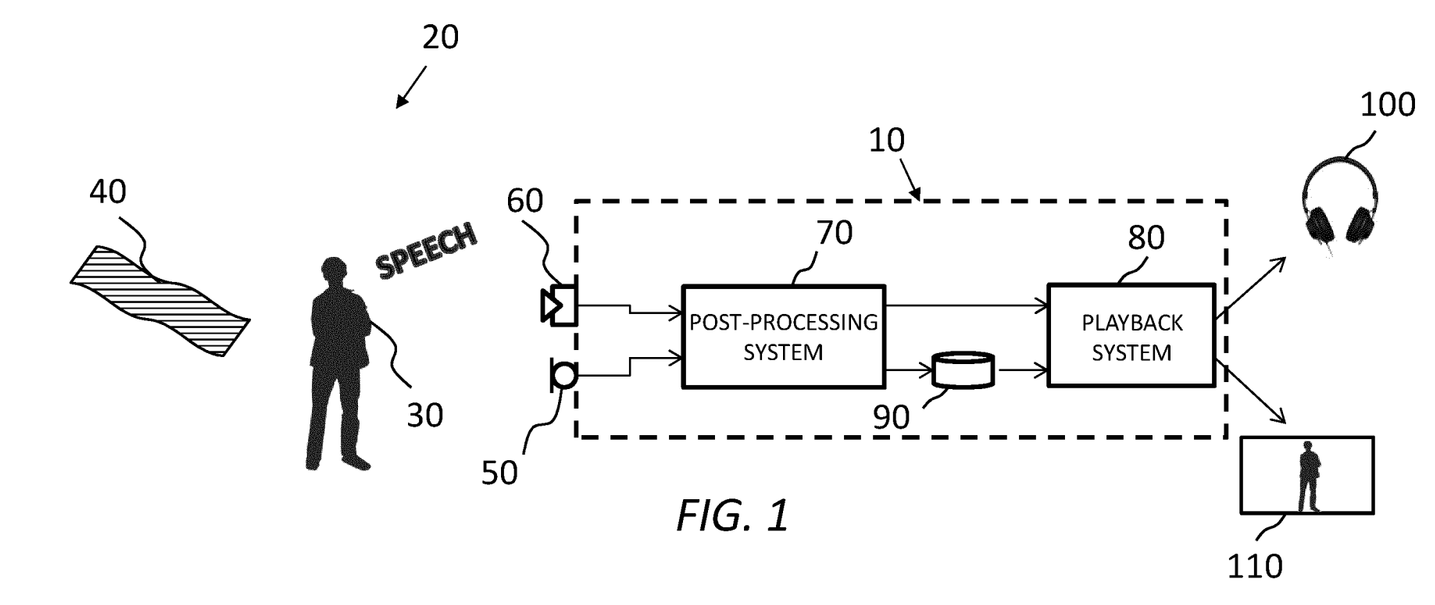
FIG. 1 is a schematic view of a system according to an example embodiment.

FIG. 1 is a schematic view comprising a system 10 according to an example embodiment. The system 10 is configured for capturing, processing and playing back a captured scene 20 which comprises a plurality of audio sources 30, 40. Each part of the system 10 may be distinct. A first audio source 30 may comprise a person 30 speaking or singing and a second audio source 40 may comprise environmental sound (alternatively "noise") such as wind. The nature of the wind is unpredictable but nonetheless may have an impact on the overall captured scene 20, such as by causing unwanted noise and movement in visual aspects of the scene, for example causing masking of wanted speech in the audio and the hair of the person 30 to move in the video. The audio sources 30, 40 may comprise any suitable source.

Additionally or alternatively, the wind noise may be created by turbulent wind inside a recording device in ports that lead to microphones or by turbulence in other places. Depending on the microphone, where a port with turbulence leads to wind noise, the wind noise may be perceived to appear in a particular direction. For example, if stereo is captured using two microphones, namely a left microphone and a right microphone, if wind noise affects only the left microphone and not the right microphone, then for a user listening to the recorded audio, wind noise will appear to be on the left.

The system 10 may comprise a smartphone or other video camera, although is not limited to such, as explained previously. The system 10 may comprise one or more microphones 50 for capturing audio in the scene 20. The system 10 may also comprise one or more video cameras 60 for capturing corresponding video from the scene 20. The one or more microphones 50 and video cameras 60 respectively provide signal representations of the captured audio and video components to a post-processing system 70 according to example embodiments. The post-processing system 70 is configured to apply processing to one or more of said audio and video components to provide an improvement in perceptual quality, for example by means of sound removal and subsequent addition, as will be explained. The resulting post-processed audio and video components may be provided to a playback system 80, either directly or indirectly. That is, the playback system 80 may comprise one or more decoders for converting the post-processed data into audio and video data for rendering and playback via respective audio and video outputs 100, no. In an indirect arrangement, the post-processed data may be provided to a memory means 90 for later playback. For example, the memory means 90 may comprise a storage unit of the system 10, such as a hard disk or memory card, or it may comprise external storage, such as cloud storage or storage on an external media server.

The audio output 100 may comprise one or more speakers, earphones or headphones. The audio output 100 may comprise part of the system 10 or may be a separate device. The video output 110 may comprise one or more video displays, such as a display of a smartphone, tablet computer or an external display such as a television, monitor or projection system.

In embodiments where the captured and post-processed audio and video data is encoded for spatial reproduction systems, e.g. Virtual Reality (VR), Augmented Reality (AR) or Mixed Reality (MR) playback, the one or more audio outputs 100 and one or more video outputs 110 may comprise part of a Virtual Reality (VR) headset or user device. As is known, a Virtual Reality (VR) headset may be provided with a live or stored feed from a content source, the feed representing at least part of a virtual space for immersive output through the headset. The position of the headset can enhance the immersive experience. A change of position, i.e. movement, can also enhance the immersive experience. Currently, most virtual reality headsets use so-called three degrees of freedom (3DoF), which means that head movement in the yaw, pitch and roll axes are measured and determine what the user sees. An enhancement is a six degrees-of-freedom (6DoF) virtual reality system, where the user may freely move in Euclidean space as well as rotate their head in the yaw, pitch and roll axes. Six degrees-of-freedom virtual reality systems enable the provision and consumption of volumetric video content. Volumetric video content comprises data representing spaces and/or objects in three-dimensions from all angles, enabling the user to move around the space and/or objects to view them from any angle. A Virtual Reality (VR) headset may comprise at least a pair of speakers and a pair of video screens.

Figure 2:
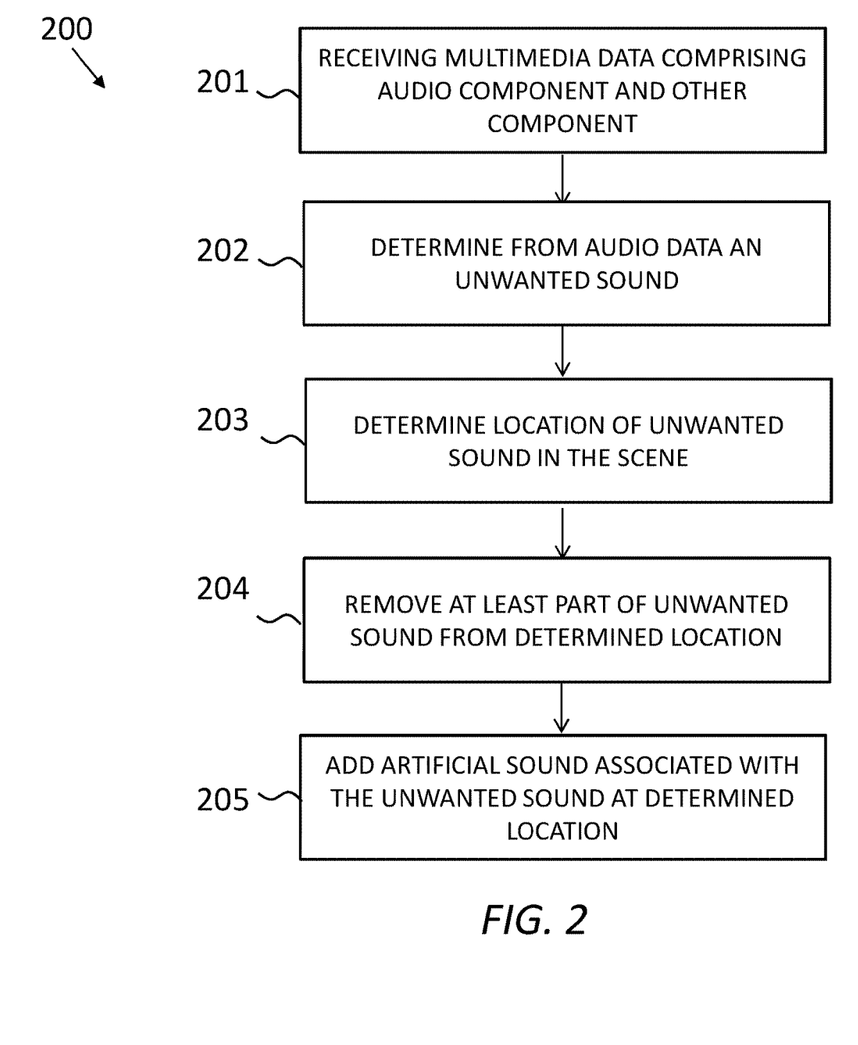
FIG. 2 is a flow diagram showing processing operations that may be performed by the FIG. 1 system.
Figure 8:
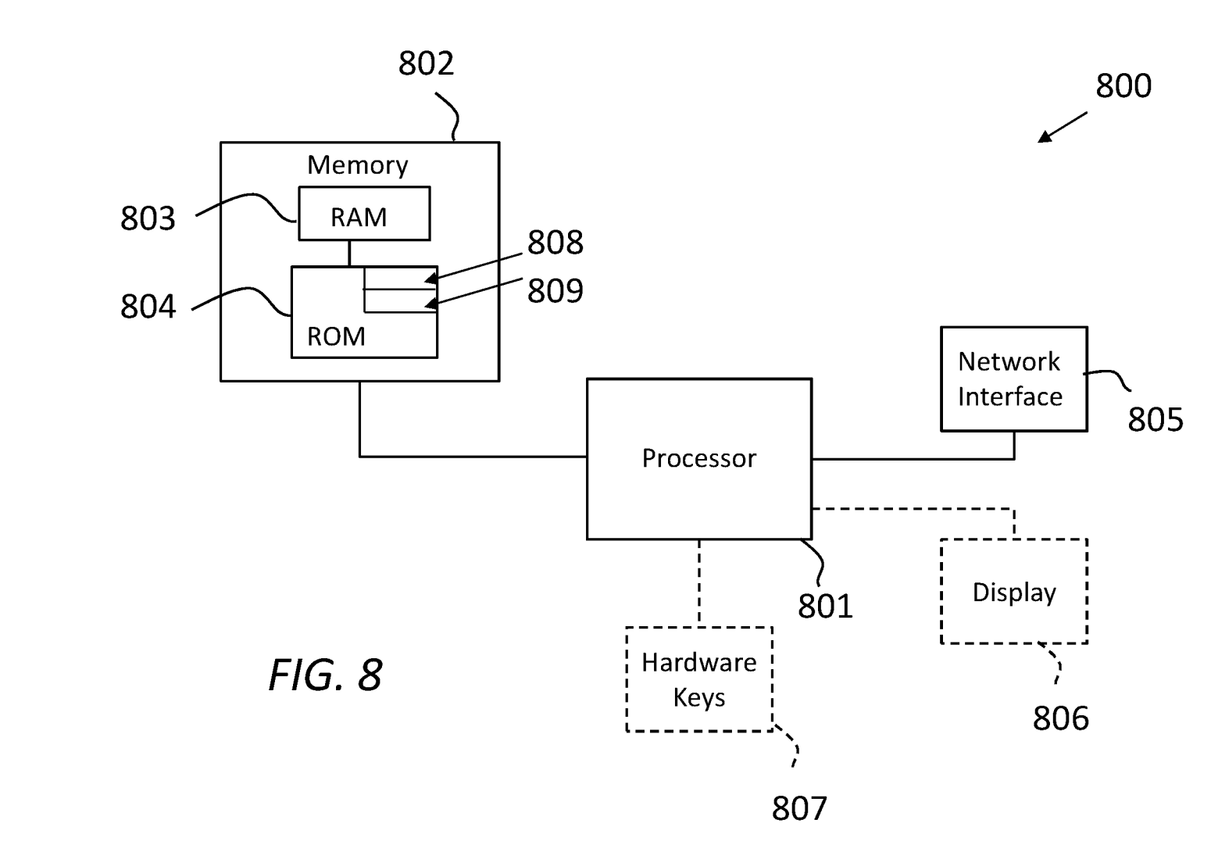
FIG. 8 is a schematic block diagram showing hardware elements of a system according to an example embodiment.

FIG. 2 is a flow diagram showing processing operations 200 that may be performed by the post-processing system 70 of FIG. 1. For example, the processing operations in FIG. 2 may be performed by hardware, software or a combination thereof at the post-processing system 70. The processing operations in FIG. 2 may be embodied in code of a software application. For example, FIG. 8 shows example hardware components of the post-processing system 70 that will be described later on, and the operations may be performed by said hardware components, possibly in conjunction with code of a software application stored on memory. The order of operations is not necessarily indicative of processing order.

A first operation 201 may comprise receiving multimedia data comprising an audio component and another component. The multimedia data may represent a captured scene, for example through an audio component and a video component.

A second operation 202 may comprise determining from the audio data an unwanted sound. This may be by means of the audio component and/or the video component. This may be by means of automatic or manual determination. In example embodiments, wind is the given example of an unwanted sound. For example, unwanted sound may be identified by comparing respective signals from a plurality of microphones and determining if the signal levels have a difference above a predetermined threshold, e.g. 6 dB. If so, the signal with the higher level may be considered as suffering from unwanted noise.

A third operation 203 may comprise determining a location of the unwanted sound in the scene. As will be explained, this may comprise one or both of a temporal location (where in the time domain of the multimedia data the unwanted sound occurs) and a spatial location (where in the two or three dimensional spatial domain of the multimedia data the unwanted sound occurs.) This may also comprise determining the intensity of the unwanted sound in the time domain, e.g. the amplitude of the unwanted sound to derive a tempo for subsequent synchronisation.

A fourth operation 204 may comprise removing at least part of the unwanted sound, at least from the determined location. Algorithms are known for removing unwanted sounds from audio signals in general, such as by using compander-based noise reduction systems, dynamic noise limiting, filtering, spectral editing, and by using general-purpose sound editing software, such as WavePad and Audacity. One or more of these methods may also be employed for wind noise removal. There are also known algorithms for removing wind noise. One method is disclosed in US patent publication number 2004/0008850 A1, the contents of which are incorporated by reference.

A fifth operation 205 may comprise adding artificial sound associated with the unwanted sound, at least at the determined location. In some embodiments, the artificial sound may be added with a tempo or intensity/amplitude level in the time domain that substantially corresponds with that of the detected unwanted sound, now removed.

Further or fewer operations may form part of the FIG. 2 processing operations.

Figure 3A:
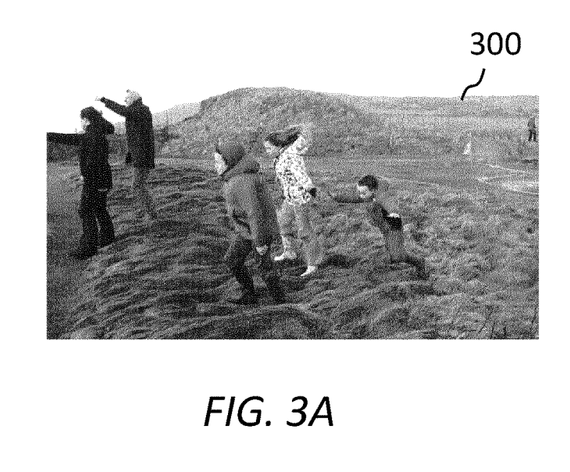
FIG. 3A is an example frame from a captured video scene, useful for understanding example embodiments.
Figure 3B:
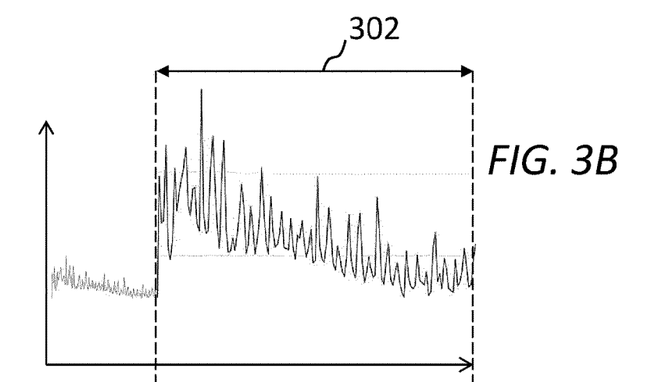
FIG. 3B is an example time-domain audio waveform, showing part of the waveform affected by unwanted sound.
Figure 3C:
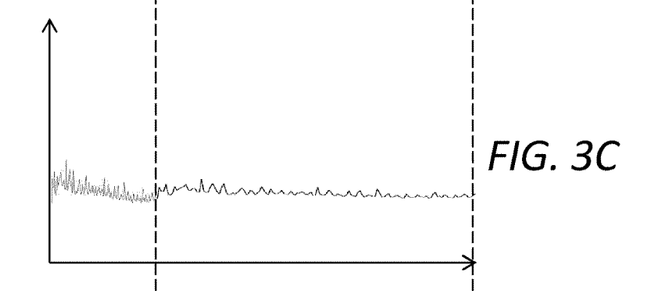
FIG. 3C is the FIG. 3B audio waveform, following wind noise removal.
Figure 3D:
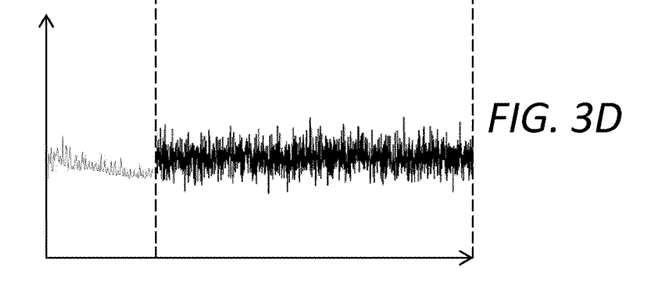
FIG. 3D is the FIG. 3C audio waveform, following artificial wind noise addition.

As mentioned above, the determined location may comprise one or more temporal locations in the scene where the unwanted sound is present and wherein the artificial sound is only added at or around said one or more temporal locations. A threshold may be established to determine when a particular sound is considered 'unwanted', e.g. wind sound above a predetermined intensity or amplitude. In this respect, FIG. 3A shows an example frame 300 from a captured video scene in which a number of people are shown in a windy environment. FIG. 3B shows an example audio waveform in the time domain, whereby part of said waveform 302 is affected by wind sound, which is unwanted due to it distorting or covering wanted emanating sounds from the people. FIG. 3C shows a post-processed version of the FIG. 3B waveform following wind noise removal (WNR) or wind noise attenuation (WNA.) As will be seen, some of the unwanted part 302 has been removed or reduced to mitigate its undesirable effects. However, wind noise removal may introduce its own artefacts and, given that the video part of the frame 300 clearly comprises wind, a perceptual inconsistency may result between the two modes of media; it may appear unrealistic. Therefore, as mentioned above, artificial wind sound may be added to produce the waveform shown in FIG. 3D. The artificial wind noise may (or may not) have known spectral properties, and may comprise additive wind sound, a pre-recorded wind sound or a combination thereof. Adding a corresponding artificial version of the unwanted sound can disguise or mask artefacts caused by unwanted sound removal techniques, and additionally achieves perceptual consistency to the overall scene when replayed.

In the FIG. 3A-3D example, the determined location comprises one or more temporal locations in the scene where the unwanted sound is present and the artificial sound is only added at or around said one or more temporal locations. By "around" it is meant that the artificial sound does not necessarily have to be limited strictly to the determined temporal location and may cross over the boundaries.

In some embodiments, the tempo of the added sound can be synchronised to the tempo of unwanted noise now removed. This may be based on the tempo as detected in the captured audio data and/or in the captured video data. Regarding the latter, the video data may be used to detect visual occurrences of wind, e.g. temporal patterns of when wind is affecting the visual scene. This may manifest itself in terms of one or more of billowing materials, blowing hair or leaning of flexible objects, such as trees. The added artificial sound may be added with an intensity or amplitude that is in synch to said visual indications of the unwanted sound.

The amount of wind noise removal (WNR) and/or additive artificial wind sound may be set to a default amount that is applied accordingly. In some example embodiments, a user interface may be associated with the post-processing system 70 shown in FIG. 1. That is, the user interface may display an interactive means of setting the default amount(s) and/or may permit subsequent adjustment of one or both amounts for previewing the effects, when applied. The interactive means may comprise one or two sliders or rotatable knobs for raising and lowering one or both of the wind noise removal (WNR) and additive artificial wind sound effects.

As also mentioned above, the determined location may alternatively, or additionally, comprise one or more spatial locations in the scene where the unwanted sound is present and wherein the artificial sound is only added at or around said one or more spatial locations. In this respect, the audio component may comprise individual representations of distinct areas within the spatial content which makes up each frame.

Figure 4A:
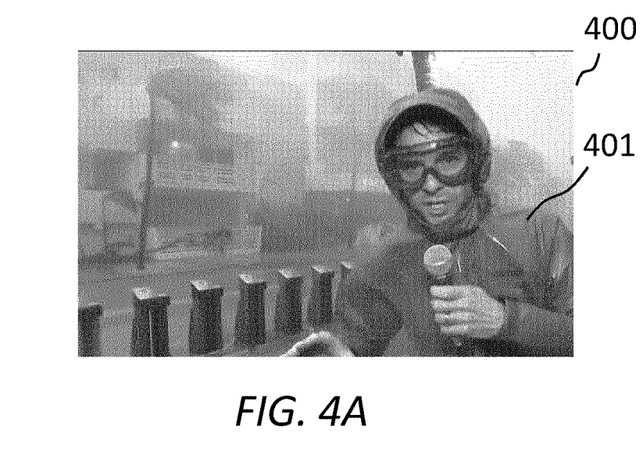
FIG. 4A is another example frame from a captured video scene, useful for understanding example embodiments.
Figure 4B:
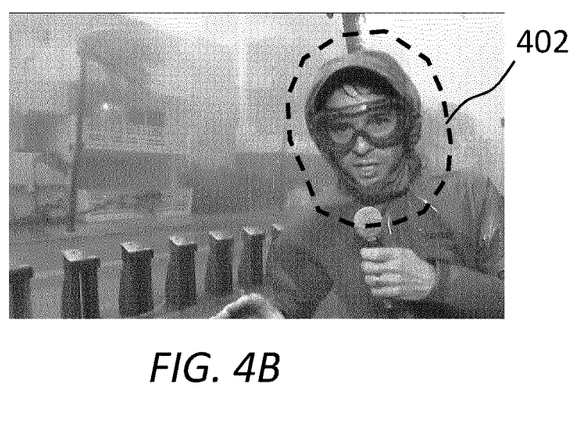
FIG. 4B is the FIG. 4A frame with identification of a region of interest.

In some embodiments, the determined location may be a part of the spatial scene. FIG. 4A shows an example frame 400 from a captured video scene in which a person 401 is shown in a windy environment. FIG. 4B shows identification of a region of interest (ROI) 402 within the frame 400, which can be performed automatically or manually. The region of interest (ROI) 402 comprises the spatial region around the person 401. Therefore, in some embodiments, the wind noise removal (WNR) can be applied to all areas and artificial wind sound addition may be applied at or around the region of interest (ROI) 402. In other embodiments, the wind noise removal (WNR) can be applied only to audio corresponding to the region of interest (ROI) 402 and artificial wind sound addition may be applied at or around the region of interest (ROI). In this way, post-processing is restricted to one or more parts of the scene on which a user is likely to be focused when consuming the content. Automatic detection of the region of interest (ROI) 402 may be achieved using known means, such as by object classification using machine learning or neural networks, saliency analysis etc.

Figure 4C:
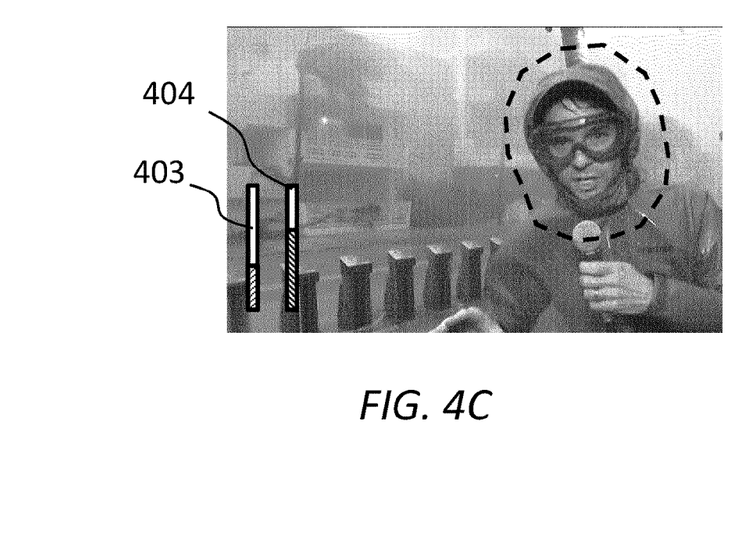
FIG. 4C is the FIG. 4B frame with user interface elements for adjustment of wind noise removal and addition.

FIG. 4C shows the FIG. 4B frame 400 with one or more user interfaces 403, 404 for manual adjustment of the amount of wind noise removal (WNR) and/or additive wind sound. As above, the amount of wind noise removal (WNR) and/or additive artificial wind sound may be set to a default amount that is applied accordingly. The user interfaces 403, 404 may be associated with the post-processing system 70 shown in FIG. 1. In this case, the user interfaces 403, 404 comprise sliders for raising and lowering the wind noise removal (WNR) and additive artificial wind sound effects respectively.

In some embodiments, a different amount of unwanted sound may be removed (or added) from inside the one or more regions of interest than from (or to) the outside.

For example, a greater amount of unwanted sound may be removed from regions corresponding with the one or more regions of interest than those outside the one or more regions of interest (to make the interesting object(s) more audible) and a greater amount of artificial sound may be added into regions outside of the one or more regions to mask artefacts due to the sound removal applied in those outside regions. For example, in some embodiments, a greater amount of sound may be added within the region of interest to account for visible indications of, for example, strong wind within that region. Different situations may determine different levels to apply.

Figure 5:
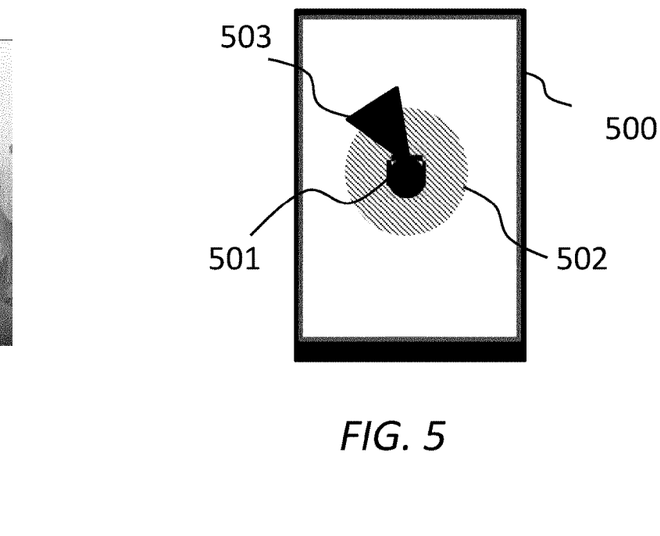
FIG. 5 is a plan view of a user interface on a device of the type that may be used to identify a region of interest according to example embodiments.

FIG. 5 is a plan view of another user interface 500 of the type that may be used to identify a region of interest (ROI) within the captured scene. The user interface 500 may be associated with the post-processing system 70 shown in FIG. 1. For example, FIG. 5 shows the user interface 500 on a display of a smartphone, but it could equally be shown for example on a tablet computer or a computer monitor. The user interface 500 shows the location of the capture position 501 and a first, two-dimensional sound field 502 representing wind sound. In this case, the wind sound 502 is from all around. The user interface 500 may also show a second two-dimensional region 503 representing a region of interest (ROI). Any suitable means for representing a limited portion of the capture space may be used. Here second two-dimensional region 503 is shown as a triangular region, but it could be a circle, square, arrow or three-dimensional equivalents (in the case of three-dimensional data.)

A user may interact with said user interface 500 to indicate where important audio is coming from, i.e. to manually indicate the spatial extent of the region of interest (ROI) using mouse or touch-screen inputs. The spatial extent may be expanded and reduced using drag inputs with respect to the second two-dimensional region 503, for example, and similarly repositioned using rotation inputs with respect to the second region. Having identified the region of interest (ROI) in this way, the above operations for applying post-processing of the audio component by wind noise removal (WNR) and/or subsequent addition of artificial wind sound may be applied to the spatial region of interest only, or thereabouts.

Figure 6:
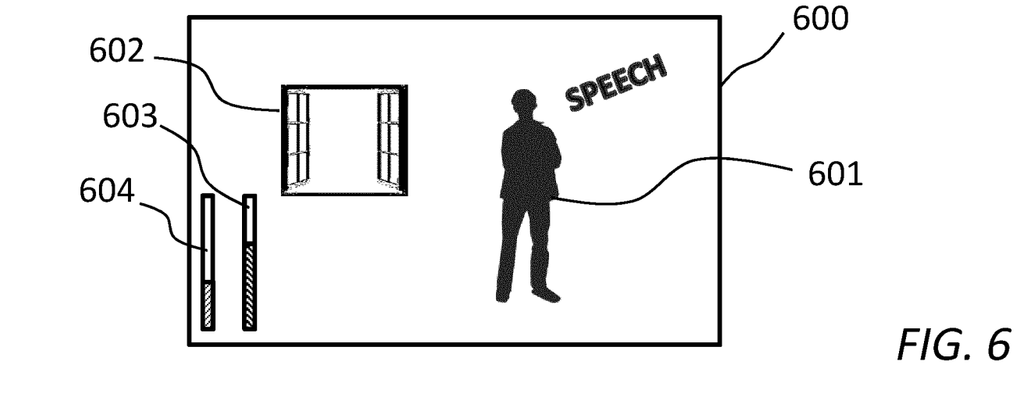
FIG. 6 is another example frame from a captured video scene, including user interface elements according to example embodiments.

FIG. 6 shows another example frame 600, captured as above, comprising two objects, namely a person 601 and a window 602. It is assumed that the person 601 represents a source of wanted sound, e.g. speech, and the window 602 a source of unwanted sound, e.g. wind sound. It will be noted however, that the person and window 601, 602 are spatially distinct. The wanted part of the scene, namely the right-hand part, may be identified either by automatic or manual techniques. In this case, wind noise removal (WNR) and additive artificial wind sound may be applied only to the right-hand part. Again, first and second user interfaces 603, 604 may be provided to permit manual adjustment from default settings.

Figure 7:
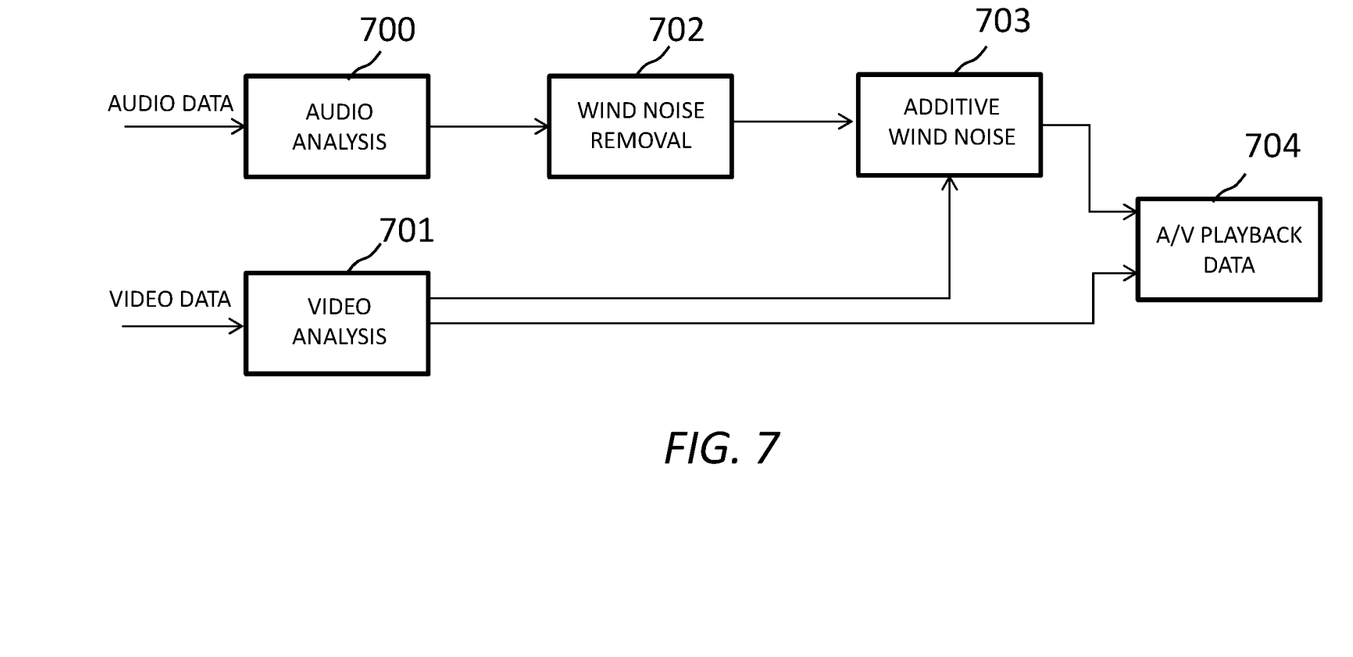
FIG. 7 is a schematic block diagram showing functional elements of a system according to an example embodiment.

FIG. 7 is a block diagram showing functional modules of the post-processing system 70 according to an example embodiment.

The post-processing system 70 comprises an audio analysis module 700 for receiving audio data from the one or more microphones 50 and a video analysis module 701 for receiving video data from the one or more video cameras 60. In some embodiments, rather than the audio data being received direct from microphones 50, the audio data may be stereo signals, binaural data etc. The audio analysis module 700 may determine the unwanted and wanted sound region(s) using audio analysis techniques and/or by spatial audio processing to determine one or more important regions, e.g. based on time-frequency (TF) tiles or with user indication. This may comprise identifying the temporal and/or spatial regions of the audio data where unwanted noise is present and/or where regions of interest (ROI) are present. The resulting region or regions may be provided to, in this case, a wind noise removal (WNR) module 702 that applies a conventional wind noise removal (WNR) processing algorithm based on the region(s) needing its application. This may remove wind sounds from all of the audio or from only those where unwanted sounds above a predetermined level are present. Similarly, the video analysis module 701 may be used to identify one or more visual regions impacted by wind (e.g. by identifying moving regions, which may be performed using a classification model particular to wind effects, e.g. based on machine learning or neural networks) and possibly also regions of interest (ROI). The resulting data may also indicate a wind noise impact tempo, indicating the temporal variation of the unwanted sound from the video data.

The output from the wind noise removal (WNR) module 702 may comprise the audio data after removal has been performed, together with data indicating the impacted region and the timing information. An additive wind sound module 704 may then take this data, and that produced by the video analysis module 701, to determine which one or more regions to add the artificial wind sound to. For example, for time-frequency (TF) tiles where the wind is attenuated more, i.e. for regions of interest, artificial sound may be added, or to a greater degree than regions not of interest. This may make the artificial wind sound appear in the direction where the unwanted wind sound was attenuated.

FIG. 8 is a schematic view of an apparatus 800 which may comprise the post-processing system 70 shown in FIG. 1 and FIG. 7.

The apparatus 800 may have a processor 801, a memory 802 closely-coupled to the processor and comprised of a RAM 803 and ROM 804. The apparatus 800 may comprise a network interface 805, and optionally a display 806 and one or more hardware keys 807. The apparatus 800 may comprise one or more network interfaces 805 for connection to a network, e.g. a radio access network. The one or more network interfaces 805 may also be for connection to the internet, e.g. using WiFi or similar, such as 3G, LTE, 5G or other network protocols or future network protocols, including, for example, Bluetooth. The processor 801 is connected to each of the other components in order to control operation thereof. In some example embodiments, the display 806 may comprise a touch-screen permitting user inputs and selections using the touch screen and/or by using a hovering gesture input. Alternatively, or additionally, the apparatus 806 may also comprise sensors such as one or more accelerometers and/or gyroscopes for individually or in combination sensing one or more user gestures, e.g. particular movements, which may serve as inputs in any of the above example embodiments. The apparatus 800 may comprise a microphone input transducer and a output transducer such as a speaker.

The memory 802 may comprise a non-volatile memory, a hard disk drive (HDD) or a solid state drive (SSD). The ROM 804 of the memory stores, amongst other things, an operating system 808 and may store one or more software applications 809. The RAM 803 of the memory 802 may be used by the processor 801 for the temporary storage of data. The operating system 808 may contain code which, when executed by the processor, implements the operations as described above and also below, for example in the flow diagram of FIG. 2. As mentioned below, the memory 802 may comprise any suitable form, and may even be implemented in the cloud.

The processor 801 may take any suitable form. For instance, the processor 801 may be a microcontroller, plural microcontrollers, a processor, or plural processors and the processor may comprise processor circuitry.

Figures 9A, 9B:
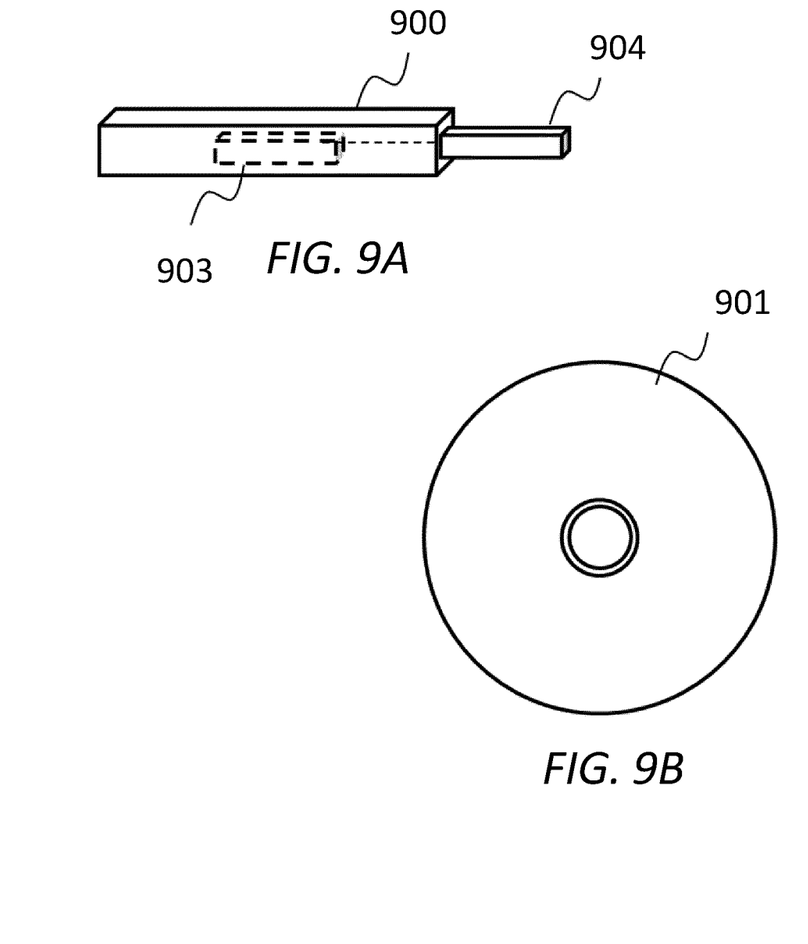
FIGS. 9A and 9B are, respectively, views of non-transitory storage media on which computer program code may be stored for performing embodiments described herein.

FIG. 9A and FIG. 9B show tangible non-volatile media, respectively a removable memory unit 900 and a compact disc (CD) 901, each storing computer-readable code which when run by a computer may perform methods according to example embodiments described above. The removable memory unit 900 may be a memory stick, e.g. a USB memory stick, having internal memory 903 storing the computer-readable code. The internal memory 903 may be accessed by a computer system via a connector 904. The CD 901 may be a CD-ROM or a DVD or similar. Other forms of tangible storage media may be used.

Methods and systems for wind noise removal have been described which may maintain consistency of audio rendering with the other modalities of a media presentation. In an example first operation, perceivable wind impact, for example, in the visual content modality is determined. The wind impacted regions are determined. In an example second operation, wind noise removal is applied to create a baseline audio track with reduced wind noise or with no wind noise. The process of wind noise removal carries the risk of introducing artefacts. Depending on the impacted audio features, wind noise removal may introduce artefacts which are not acceptable. In an example third operation, suitable artificial wind noise (e.g. additive wind sound or "noise") may be added with an intensity which is in temporal synch with the wind impact features in the visual modality. The final output audio may therefore have scene compliant wind noise effect inserted, which serves the purpose of maintaining multimodal scene sanctity and masks undesired effects of the wind noise removal. It also limits the amount (or intensity) of wind noise removal that needs to be employed.

Although a video data component is the given example of the additional multimedia component, one or more other components may be employed. For example, a haptic component whereby movement or forces are fed-back to the consuming user to mimic or signify captured content may be used as the additional multimedia component and hence the audio content may be modified as above to maintain consistency between sounds and the haptic effects applied to a user.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some example embodiments may be implemented in the cloud and utilize virtualized modules.

Example embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
  at least one processor; and
  at least one non-transitory memory including computer program code, the at least one memory and the computer program code configured to, with the at least one processor, cause the apparatus to at least the following:
    receive multimedia data representing a scene, the multimedia data comprising at least audio data representing an audio component of the scene;
    determine at least one location of unwanted sound in the scene, wherein the at least one determined location comprises one or more spatial locations in the scene where the unwanted sound is present;
    perform first audio processing to remove at least part of the unwanted sound from the at least one determined location;
    perform second audio processing to add artificial sound associated to the unwanted sound at or proximate the at least one determined location;
    identify one or more regions of interest based on object classification; and
    determine whether the at least one determined location of unwanted sound corresponds with the one or more regions of interest, wherein a correspondence between the at least one determined location of unwanted sound and the one or more regions of interest affects:
      an amount of the unwanted sound removed via the first audio processing, and
      an amount of the artificial sound added via the second audio processing.

2. The apparatus according to claim 1, wherein the unwanted sound comprises wind noise, wherein the first audio processing comprises wind noise removal, and the second audio processing comprises adding artificial wind noise.

3. The apparatus according to claim 1, wherein the at least one determined location further comprises one or more temporal locations in the scene where the unwanted sound is present and wherein the artificial sound is added at or proximate the one or more temporal locations.

4. The apparatus according to claim 3, wherein the at least one memory and the computer program code are configured to, with the at least one processor, cause the apparatus to:
determine an intensity of the unwanted sound in a time domain and wherein the artificial sound is added with an intensity that is substantially synchronised in the time domain with the intensity of the unwanted sound.

5. The apparatus according to claim 3, wherein the multimedia data further comprises video data representing a video component of the scene, wherein the at least one memory and the computer program code are configured to, with the at least one processor, cause the apparatus to:
determine from the video data one or more of the one or more temporal locations or the one or more spatial locations in the scene where the unwanted sound is present.

6. The apparatus according to claim 5, wherein the at least one memory and the computer program code are configured to, with the at least one processor, cause the apparatus to:
determine presence of the unwanted sound based on movement of objects within the scene at the one or more of the one or more temporal locations or the one or more spatial locations.

7. The apparatus according to claim 3, wherein the multimedia data further comprises haptic data representing a haptic component of the scene, wherein the at least one memory and the computer program code are configured to, with the at least one processor, cause the apparatus to:
determine from the haptic data one or more of the one or more temporal locations or the one or more spatial locations in the scene where the unwanted sound is present.

8. The apparatus according to claim 1, wherein the at least one memory and the computer program code are configured to, with the at least one processor, cause the apparatus to:
remove, with the first audio processing, a different amount of the unwanted sound from locations corresponding with the one or more regions of interest than those outside the one or more regions of interest.

9. The apparatus according to claim 1, wherein the at least one memory and the computer program code are configured to, with the at least one processor, cause the apparatus to:
remove, with the first audio processing, a greater amount of the unwanted sound from locations corresponding with the one or more regions of interest than those outside the one or more regions of interest; and
add, with the second audio processing, a greater amount of the artificial sound into locations outside the one or more regions of interest than those inside the one or more regions of interest.

10. The apparatus according to claim 1, wherein the at least one memory and the computer program code are configured to, with the at least one processor, cause the apparatus to:
provide a user interface showing default amounts of the first audio processing and the second audio processing;
receive user input for modifying one or both default amounts; and
enable playback to preview an effect of the first audio processing and the second audio processing.

11. A method comprising:
receiving multimedia data representing a scene, the multimedia data comprising a plurality of media components including audio data representing an audio component of the scene;
determining at least one location of unwanted sound in the scene, wherein the at least one determined location comprises one or more spatial locations in the scene where the unwanted sound is present;
performing first audio processing to remove at least part of the unwanted sound from the at least one determined location;
performing second audio processing to add artificial sound associated to the unwanted sound at or proximate the at least one determined location;
identifying one or more regions of interest based on object classification; and
determining whether the at least one determined location of unwanted sound corresponds with the one or more regions of interest, wherein a correspondence between the at least one determined location of unwanted sound and the one or more regions of interest affects:
an amount of the unwanted sound removed via the first audio processing, and
an amount of the artificial sound added via the second audio processing.

12. The method according to claim 11, wherein the unwanted sound comprises wind noise, wherein the first audio processing comprises wind noise removal, and the second audio processing comprises adding artificial wind noise.

13. The method according to claim 11, wherein the at least one determined location further comprises one or more temporal locations in the scene where the unwanted sound is present and wherein the artificial sound is added at or proximate the one or more temporal locations.

14. The method according to claim 13, further comprising, determining an intensity of the unwanted sound in a time domain and wherein the artificial sound is added with an intensity that is substantially synchronised in the time domain with the intensity of the unwanted sound.

15. The method according to claim 13, wherein the multimedia data further comprises video data representing a video component of the scene, further comprising determining from the video data one or more of the one or more temporal or the one or more spatial locations in the scene where the unwanted sound is present.

16. The method according to claim 15, comprising, determining presence of the unwanted sound based on movement of objects within the scene at the one or more of the one or more temporal or the one or more spatial locations.

17. A non-transitory computer readable medium comprising program instructions stored thereon for performing at least the following:
receiving multimedia data representing a scene, the multimedia data comprising a plurality of media components including audio data representing an audio component of the scene;
determining at least one location of unwanted sound in the scene, wherein the at least one determined location comprises one or more spatial locations in the scene where the unwanted sound is present;
performing first audio processing to remove at least part of the unwanted sound from the at least one determined location; and
performing second audio processing to add artificial sound associated to the unwanted sound at or proximate the at least one determined location;
identifying one or more regions of interest based on object classification; and
determining whether the at least one determined location of unwanted sound corresponds the one or more regions of interest, wherein a correspondence between the at least one determined location of unwanted sound and the one or more regions of interest affects:
an amount of the unwanted sound removed via the first audio processing, and
an amount of the artificial sound added via the second audio processing.

\* \* \* \* \*